Figure 1:
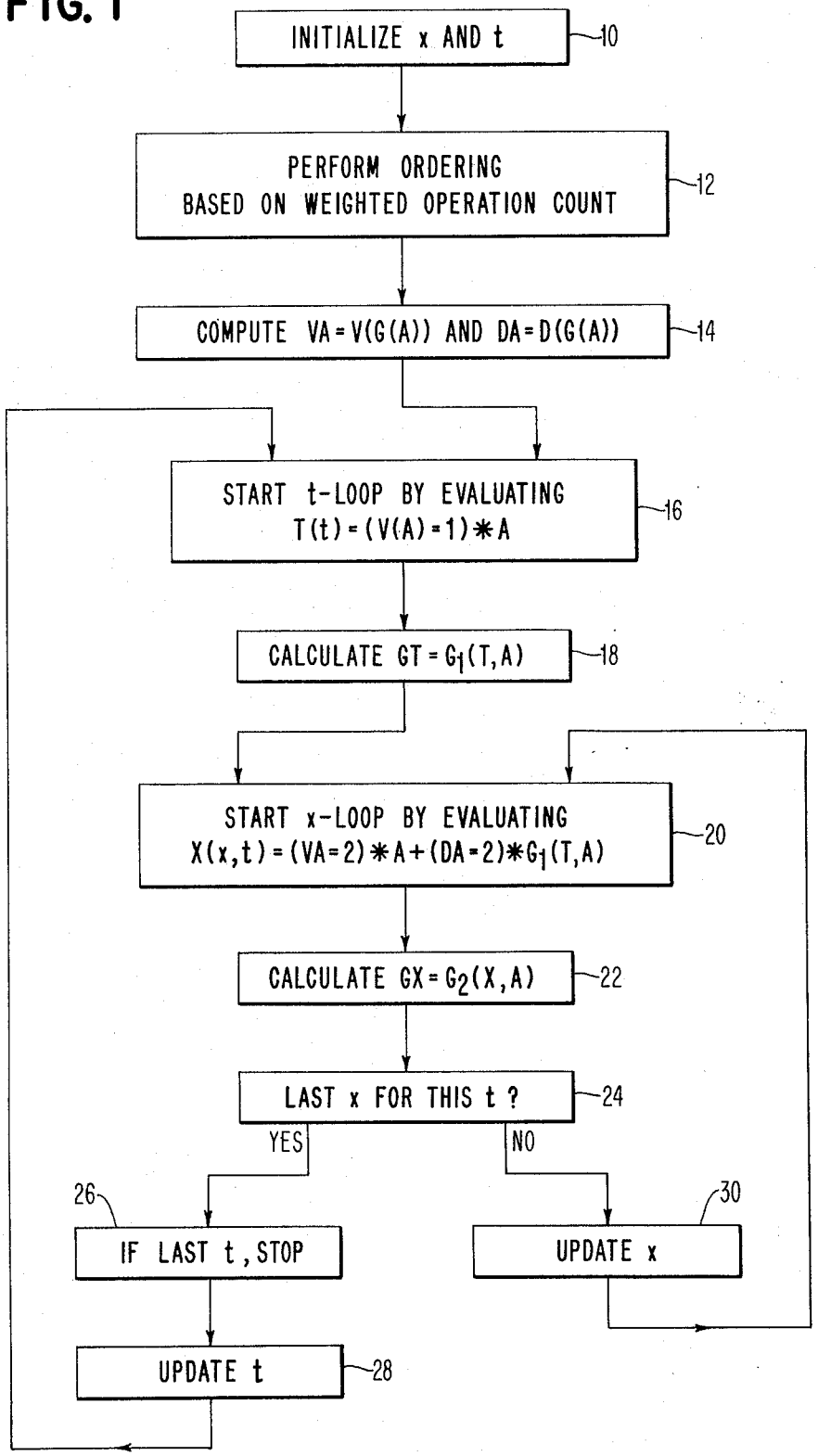
Figure 2:
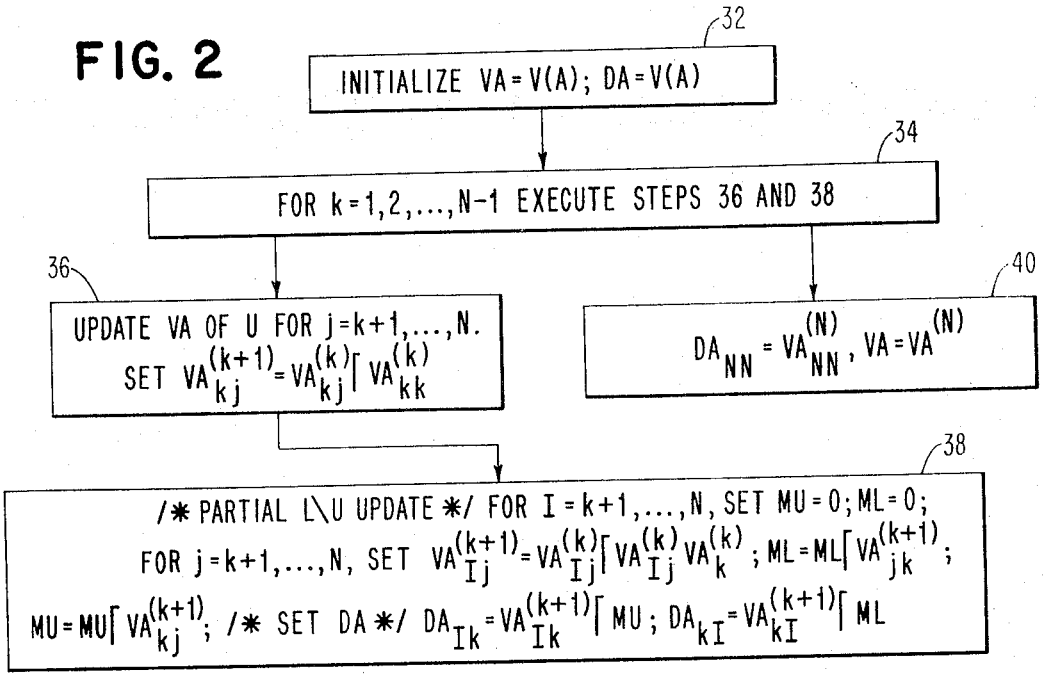
Figure 3:
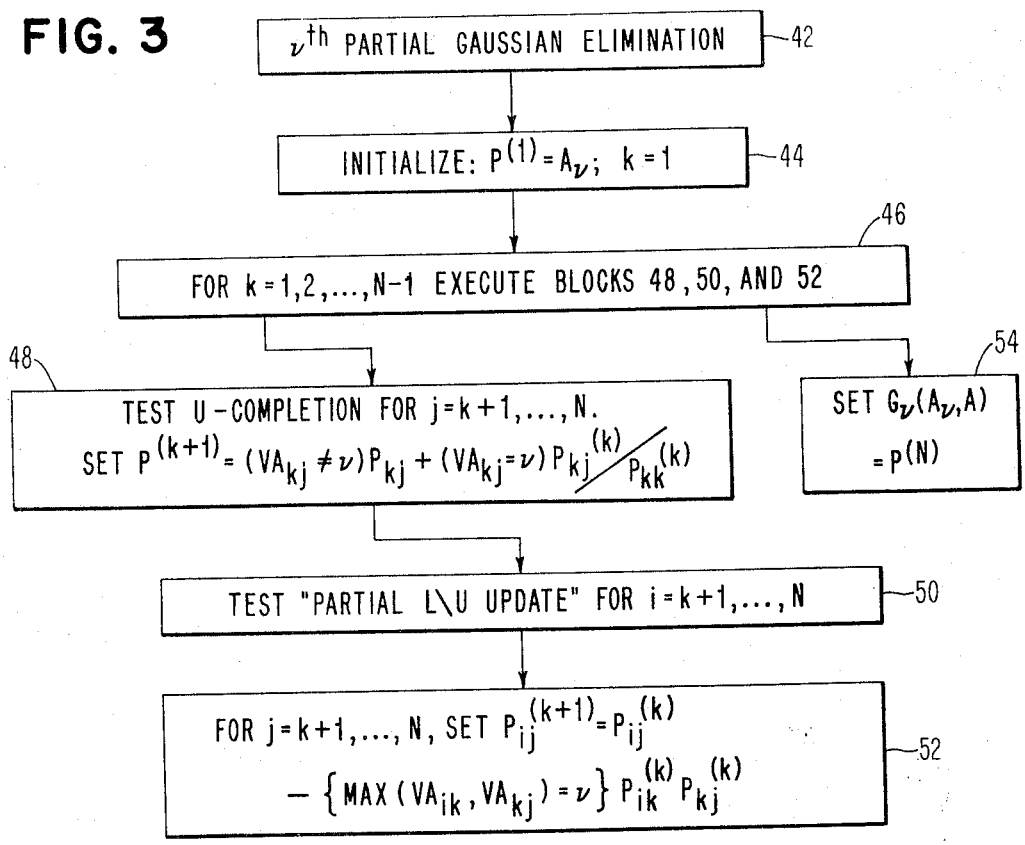
Figure 4:
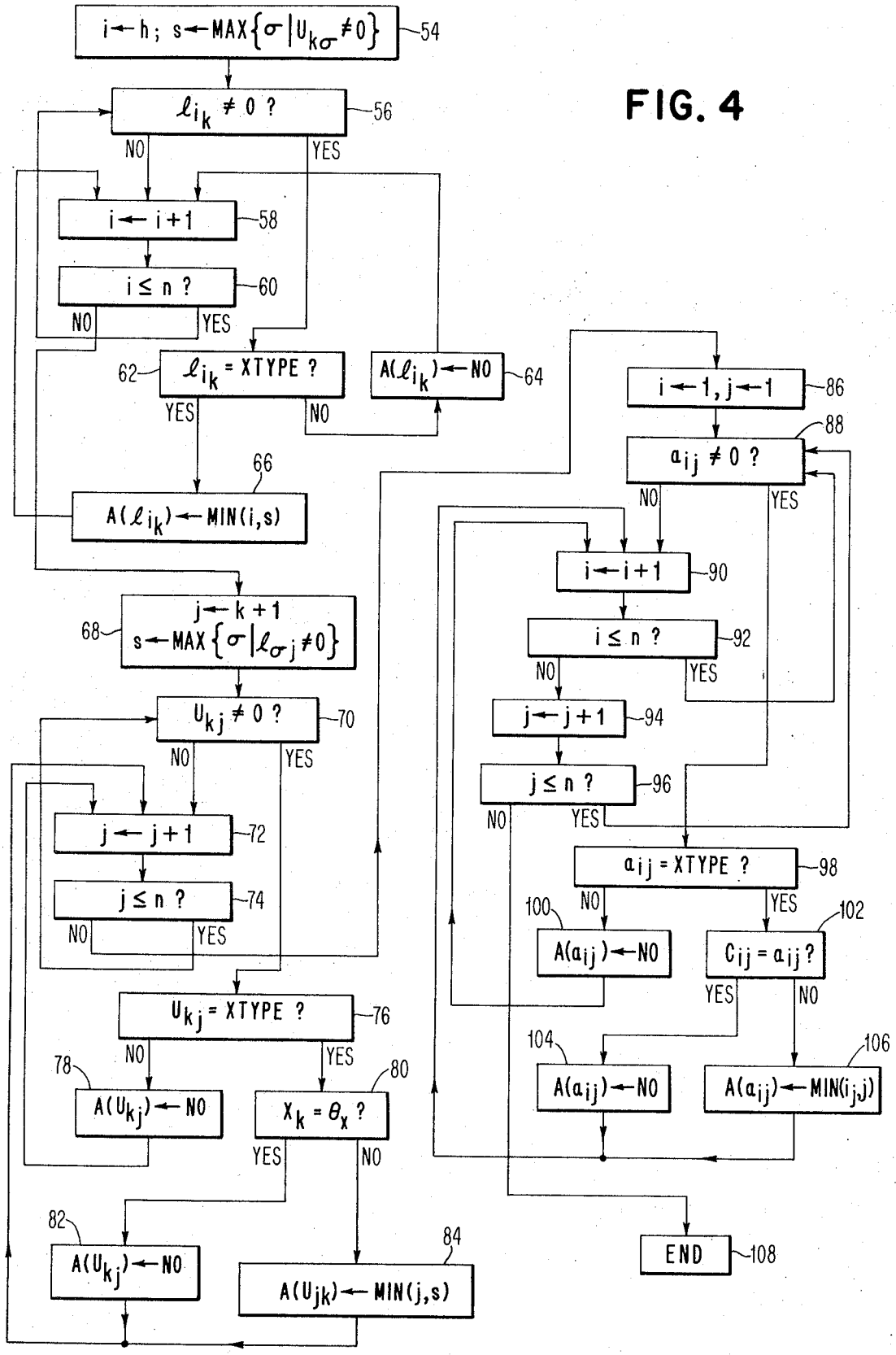

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 9, 1973

915 O.G. 386

T915,008

METHOD FOR EFFECTING GAUSS ELIMINATION IN SPARSE MATRIX TECHNIQUES

Fred G. Gustavson and Gary D. Hachtel, Ossining, N.Y., assignors to International Business Machines Corporation, Armonk, N.Y.

Filed Apr. 6, 1973, Ser. No. 348,833
Int. Cl. G06f *7/38*
U.S. Cl. 444—1
3 Sheets Drawing. 32 Pages Specification

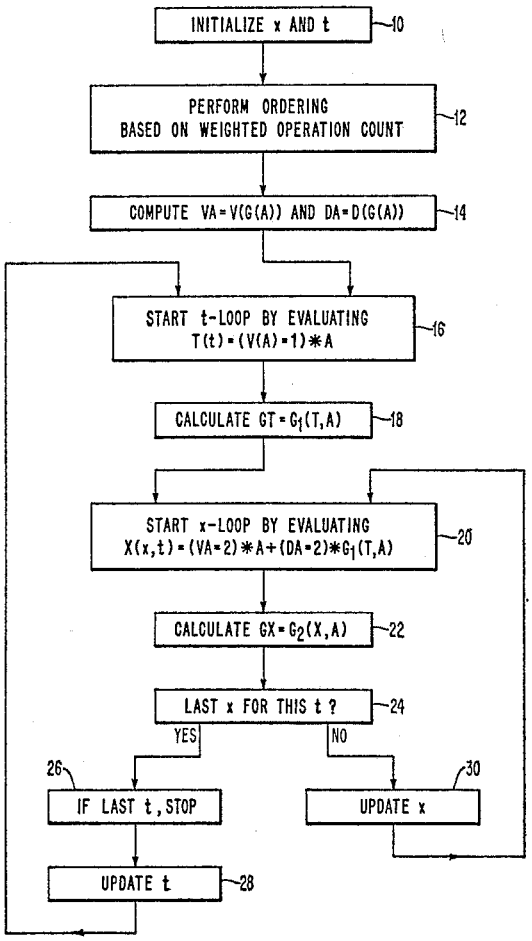

A novel method is disclosed for solving the equation $A[t,x]y=e_N=\text{col}\ (0,0,\ .\ .\ .\ ,0,1)$ for various values of $t$, and, for each $t$, for many distinct values of $x$, and wherein, there is combined the storage advantages of the "looping, pre-indexed fill" technique with the inherent speed and storage advantages of the 1–2–3 GNSO technique for obtaining a minimum storage, medium speed algorithm for solving the above equation. The method defines a new type of decomposition of the Gauss elimination matrix, G(A) of a given matrix $A(x,t)$ into "partial" Gauss elimination of distinct matrices $T(t)$ and $X(x,t)$, wherein T contains the necessary and sufficient data structure for $t$-type operations in G(A), i.e., T contains only nonzero elements which are used in wholly $t$-type operations in G(A), and X contains the necessary and sufficient data structure for the $x$-type operations. In addition, the method defines algorithms for the two distinct partial Gauss eliminations $G_1(T,A)$ and $G_2(X,A)$, employing a looping pre-indexed, variability typed fill technique. The method eliminates the necessity for precompiling, i.e., generating and storing instructions for type-decomposed Gauss elimination of the 1–2–3 GNSO approach, and extends immediately to the case of three or more distinct variability types appearing as arguments in the coefficients of the matrix A.